United States Patent
Harding et al.

(10) Patent No.: US 7,629,542 B1
(45) Date of Patent: Dec. 8, 2009

(54) SUITCASE WITH INTERNAL NETTING CONNECTED TO TENSION SENSORS FOR WEIGHING CONTENTS

(76) Inventors: Victor Harding, 1315 Chandler St., Far Rockaway, NY (US) 11691; Ethel Harding, 1315 Chandler St., Far Rockaway, NY (US) 11691

( * ) Notice: Subject to any disclaimer, the term of this patent is extended or adjusted under 35 U.S.C. 154(b) by 0 days.

(21) Appl. No.: 12/286,439

(22) Filed: Sep. 30, 2008

(51) Int. Cl.
*G01G 19/52* (2006.01)
*G01G 19/58* (2006.01)
*G01G 21/22* (2006.01)
*G01G 21/23* (2006.01)

(52) U.S. Cl. .................. 177/148; 177/245; 177/263; 190/100

(58) Field of Classification Search ............... 177/131, 177/148, 149, 245, 262, 263; 190/100
See application file for complete search history.

(56) References Cited

U.S. PATENT DOCUMENTS

| 25,203 | A | * | 8/1859 | Kelly | 177/262 |
|---|---|---|---|---|---|
| 2,937,016 | A | | 5/1960 | Westman | |
| 3,090,454 | A | | 5/1963 | Farrar et al. | |
| 3,279,549 | A | * | 10/1966 | Feinberg et al. | 177/126 |
| D263,177 | S | | 3/1982 | Gibbs | |
| 6,661,341 | B2 | * | 12/2003 | Masuda et al. | 340/562 |
| 6,814,370 | B2 | * | 11/2004 | Yasui | 280/735 |
| 6,849,808 | B2 | * | 2/2005 | Enomoto et al. | 177/144 |
| 6,929,324 | B2 | * | 8/2005 | Enomoto et al. | 297/217.3 |
| 7,131,513 | B2 | * | 11/2006 | Mutou et al. | 180/273 |
| 7,156,918 | B2 | * | 1/2007 | Marks | 177/168 |
| 7,161,097 | B1 | * | 1/2007 | Gorgone | 177/126 |
| 7,349,456 | B2 | * | 3/2008 | Bour et al. | 372/45.01 |
| 7,378,604 | B2 | * | 5/2008 | Truong | 177/131 |
| 7,523,803 | B2 | * | 4/2009 | Breed | 180/273 |
| 2004/0032117 | A1 | * | 2/2004 | Pinto et al. | 280/735 |
| 2005/0051586 | A1 | | 3/2005 | Siwak et al. | |
| 2005/0217903 | A1 | | 10/2005 | Roberts et al. | |
| 2005/0217904 | A1 | | 10/2005 | Hughes | |
| 2005/0224261 | A1 | | 10/2005 | Marks | |
| 2006/0054364 | A1 | * | 3/2006 | Kamakau | 177/180 |
| 2006/0196798 | A1 | * | 9/2006 | Kowalczyk | 206/459.5 |

\* cited by examiner

*Primary Examiner*—Randy W Gibson

(57) ABSTRACT

Suitcases with internal load determination devices determine the weight of a suitcase without requiring the user to lift the loaded suitcase. A sensor grid suspended within the interior of the suitcase's bottom is attached to sensors. When a load is placed on the sensor grid, the force exerted by the sensor grid on the sensors is measured and communicated to a CPU. The CPU calculates the weight of the load and displays it to the user on an electronic display. An on/off switch toggles the display between showing the net weight of the load and the gross weight of the loaded suitcase, as well as controlling the flow of electricity from a battery to the CPU, display, and sensors. The suitcase has a handle that extends over the display, feet, wheels, and latches. A method for using the suitcase with internal load determination device is also disclosed.

15 Claims, 4 Drawing Sheets

SUITCASE WITH INTERNAL NETTING CONNECTED TO TENSION SENSORS FOR WEIGHING CONTENTS

BACKGROUND OF THE INVENTION

1. Field of the Invention

The present invention relates to a suitcase with internal load determination device for use in connection with luggage. The suitcase with internal load determination device has particular utility in connection with determining the weight of a suitcase without requiring the user to lift the loaded suitcase.

2. Description of the Prior Art

Suitcases with internal load determination devices are desirable for determining the weight of a suitcase without requiring the user to lift the loaded suitcase. Airlines have established a maximum weight that a loaded piece of luggage cannot exceed without a surcharge. Weighing a suitcase on a household scale is difficult to do accurately and requires the traveler to lift the loaded suitcase to determine its weight. Lifting a suitcase that is too heavy may injure the traveler. On the other hand, not determining the suitcase's weight before checking in for a flight means the traveler risks having to pay a surcharge or having to purchase an additional piece of luggage to avoid the overweight baggage fee. Various weight determining mechanisms for luggage are known, but they all require the user to lift the loaded luggage as part of the weight determining process.

The use of weight determining mechanisms for a backpack or other luggage is known in the prior art. For example, United States Patent Application Publication Number 2005/0051586 to Siwak et al. discloses a weight determining mechanism for a backpack or other luggage. However, the Siwak et al. 2005/0051586 patent application publication does not have a sensor grid, and has further drawbacks of requiring the user to lift the loaded luggage to determine its weight.

United States Patent Application Publication Number 2005/0217903 to Roberts et al. discloses a luggage device with built-in load determination that has a load determination capability. However, the Roberts et al. 2005/0217903 patent application publication does not have a sensor grid, and additionally does not determine luggage weight without requiring the user to lift the loaded luggage.

Similarly, United States Patent Application Publication Number 2005/0217904 to Hughes discloses a container with built-in weighing device that displays the weight of the container. However, the Hughes 2005/0217904 patent application publication does not have a sensor grid, and cannot determine the container's weight without requiring the user to lift it into a standing position.

In addition, United States Patent Application Publication Number 2005/0224261 to Marks discloses a weighing devices that provides an indication of the weight of a piece of luggage. However, the Marks 2005/0224261 patent application publication does not have a sensor grid, and also does not have the ability to determine the weight of a piece of luggage without requiring the user to lift the loaded luggage.

Furthermore, U.S. Pat. No. 3,090,454 to Farrar et al. discloses a scale luggage handle that permits weighing the luggage by grasping the handle and lifting the luggage thereby when the handle is in weighing position. However, the Farrar et al. '454 patent does not have a sensor grid, and further lacks the ability to determine the luggage's weight without requiring the user to lift the loaded luggage.

U.S. Pat. No. 2,937,016 to Westman discloses a handle weighing mechanism for luggage that weighs luggage when the baggage is suspended from its handle. However, the Westman '016 patent does not have a sensor grid, and has the additional deficiency of requiring the user to lift the loaded luggage to determine its weight.

Lastly, U.S. Pat. No. D263,177 to Gibbs discloses a suitcase that is an ornamental design for a suitcase. However, the Gibbs '177 patent does not have a load determination device, and also does not have wheels.

While the above-described devices fulfill their respective, particular objectives and requirements, the aforementioned patents do not describe a suitcase with internal load determination device that allows determining the weight of a suitcase without requiring the user to lift the loaded suitcase.

Therefore, a need exists for a new and improved suitcase with internal load determination device that can be used for determining the weight of a suitcase without requiring the user to lift the loaded suitcase. In this regard, the present invention substantially fulfills this need. In this respect, the suitcase with internal load determination device according to the present invention substantially departs from the conventional concepts and designs of the prior art, and in doing so provides an apparatus primarily developed for the purpose of determining the weight of a suitcase without requiring the user to lift the loaded suitcase.

SUMMARY OF THE INVENTION

In view of the foregoing disadvantages inherent in the known types of weight determining mechanisms for a backpack or other luggage now present in the prior art, the present invention provides an improved suitcase with internal load determination device, and overcomes the above-mentioned disadvantages and drawbacks of the prior art. As such, the general purpose of the present invention, which will be described subsequently in greater detail, is to provide a new and improved suitcase with internal load determination device which has all the advantages of the prior art mentioned heretofore and many novel features that result in a suitcase with internal load determination device which is not anticipated, rendered obvious, suggested, or even implied by the prior art, either alone or in any combination thereof.

To attain this, the present invention essentially comprises a bottom with one of its opposing sides hingedly attached to one of the opposing sides of a top. A CPU is attached to one of the opposing sides of the bottom opposite the hingedly attached side. A display is electrically connected to the CPU. A battery is attached to one of the opposing sides of the bottom adjacent to the CPU. A plurality of sensors are attached to the opposing sides and the opposing ends of the bottom. A sensor grid is suspended within the interior of the bottom and connected to the sensors. A plurality of wires electrically connects the sensors, the battery, the CPU, and the display to one another.

There has thus been outlined, rather broadly, the more important features of the invention in order that the detailed description thereof that follows may be better understood and in order that the present contribution to the art may be better appreciated.

The invention may also include an on/off switch electrically connected by the wires to the battery, the display, the CPU, and the sensors. There may be a handle attached to one of the opposing sides of the bottom that extends over the display. There may be a plurality of feet attached to the hingedly attached side of the top. There may be a plurality of wheels attached to the hingedly attached side of the bottom. The display may be an LCD display, an LED display, or an OLED display. There may be a latch releasably connecting one of the opposing sides of the top to one of the opposing sides of the bottom. The invention may be an improvement to a suitcase. The invention may be a method for determining the internal load of a suitcase comprising the steps of: obtaining the suitcase with internal load determination device; opening the suitcase with internal load determination device; placing a load in the interior of the bottom on top of the sensor grid; depressing the on/off switch; responsive to the on/off switch being depressed, the sensors measuring force exerted on them by the load on top of the sensor grid and providing the measurements to the CPU; responsive to receiving the measurements from the sensors, the CPU calculating a weight of the load on top of the sensor grid and directing the display to display the weight of the load; viewing the weight of the load on the display; depressing the on/off switch; responsive to the on/off switch being depressed, the CPU adding an empty weight of the suitcase with internal load determination device to the weight of the load and directing the display to display a combined weight of the load and the empty weight of the suitcase with internal load determination device; and viewing the combined weight on the display. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved suitcase with internal load determination device that has all of the advantages of the prior art weight determining mechanisms for a backpack or other luggage and none of the disadvantages.

It is another object of the present invention to provide a new and improved suitcase with internal load determination device that may be easily and efficiently manufactured and marketed.

An even further object of the present invention is to provide a new and improved suitcase with internal load determination device that has a low cost of manufacture with regard to both materials and labor, and which accordingly is then susceptible of low prices of sale to the consuming public, thereby making such suitcase with internal load determination device economically available to the buying public.

Still another object of the present invention is to provide a new suitcase with internal load determination device that provides in the apparatuses and methods of the prior art some of the advantages thereof, while simultaneously overcoming some of the disadvantages normally associated therewith.

Even still another object of the present invention is to provide a suitcase with internal load determination device for determining the weight of a suitcase without requiring the user to lift the loaded suitcase. This allows a traveler to determine the weight of their loaded suitcase without having to lift it.

Still yet another object of the present invention is to provide a suitcase with internal load determination device for determining the weight of a suitcase without requiring the user to lift the loaded suitcase. This makes it possible for a traveler to avoid overweight baggage charges.

An additional object of the present invention is to provide a suitcase with internal load determination device for determining the weight of a suitcase without requiring the user to lift the loaded suitcase. This enables a traveler to avoid injury by not lifting a suitcase that is too heavy.

A further object of the present invention is to provide a suitcase with internal load determination device for determining the weight of a suitcase without requiring the user to lift the loaded suitcase. This enables a traveler to determine the weight of the load alone or the total weight of the loaded suitcase.

Lastly, it is an object of the present invention to provide a new and improved suitcase with internal load determination device for determining the weight of a suitcase without requiring the user to lift the loaded suitcase.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
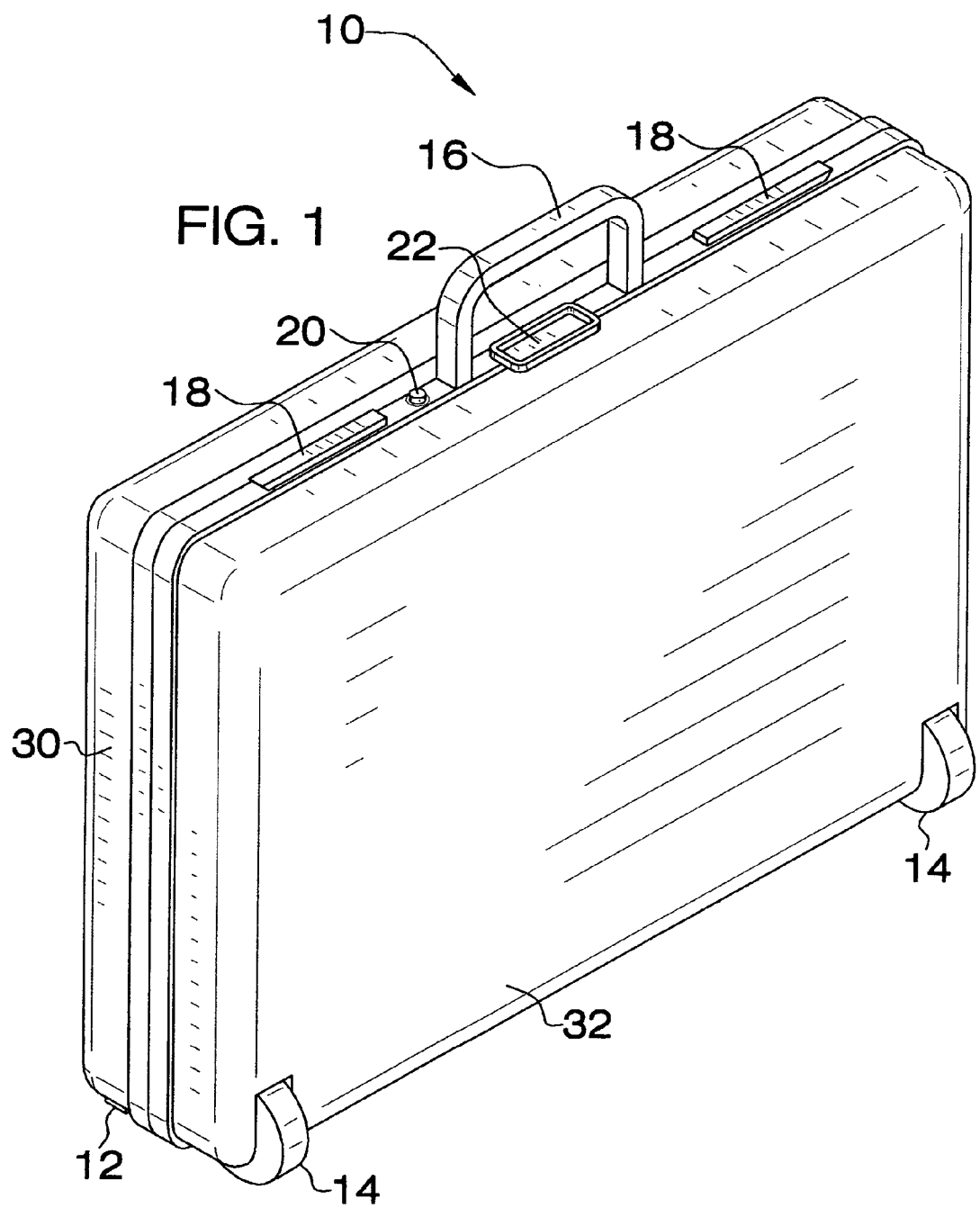
FIG. 1 is a top perspective view of the current embodiment of the suitcase with internal load determination device constructed in accordance with the principles of the present invention.

Referring now to the drawings, and particularly to FIGS. 1-4, a current embodiment of the suitcase with internal load determination device of the present invention is shown and generally designated by the reference numeral 10.

In FIG. 1, a new and improved suitcase with internal load determination device 10 of the present invention for determining the weight of a suitcase without requiring the user to lift the loaded suitcase is illustrated and will be described. More particularly, the suitcase with internal load determination device 10 is depicted in its closed position and has a top 30 and a bottom 32. Two feet 12 (only one of which is visible) are attached to one side of top 30. Two wheels 14 are attached to one side of bottom 32. Two latches 18, handle 16, display 22, and on/off switch 20 are attached to the side of bottom 32 opposite wheels 14. Latches 18 are releasably latched to hold suitcase with internal load determination device 10 closed. Display 22 is an LCD display in the current embodiment. In the current embodiment, suitcase with internal load determination device 10 is made of hard plastic.

Figure 2:
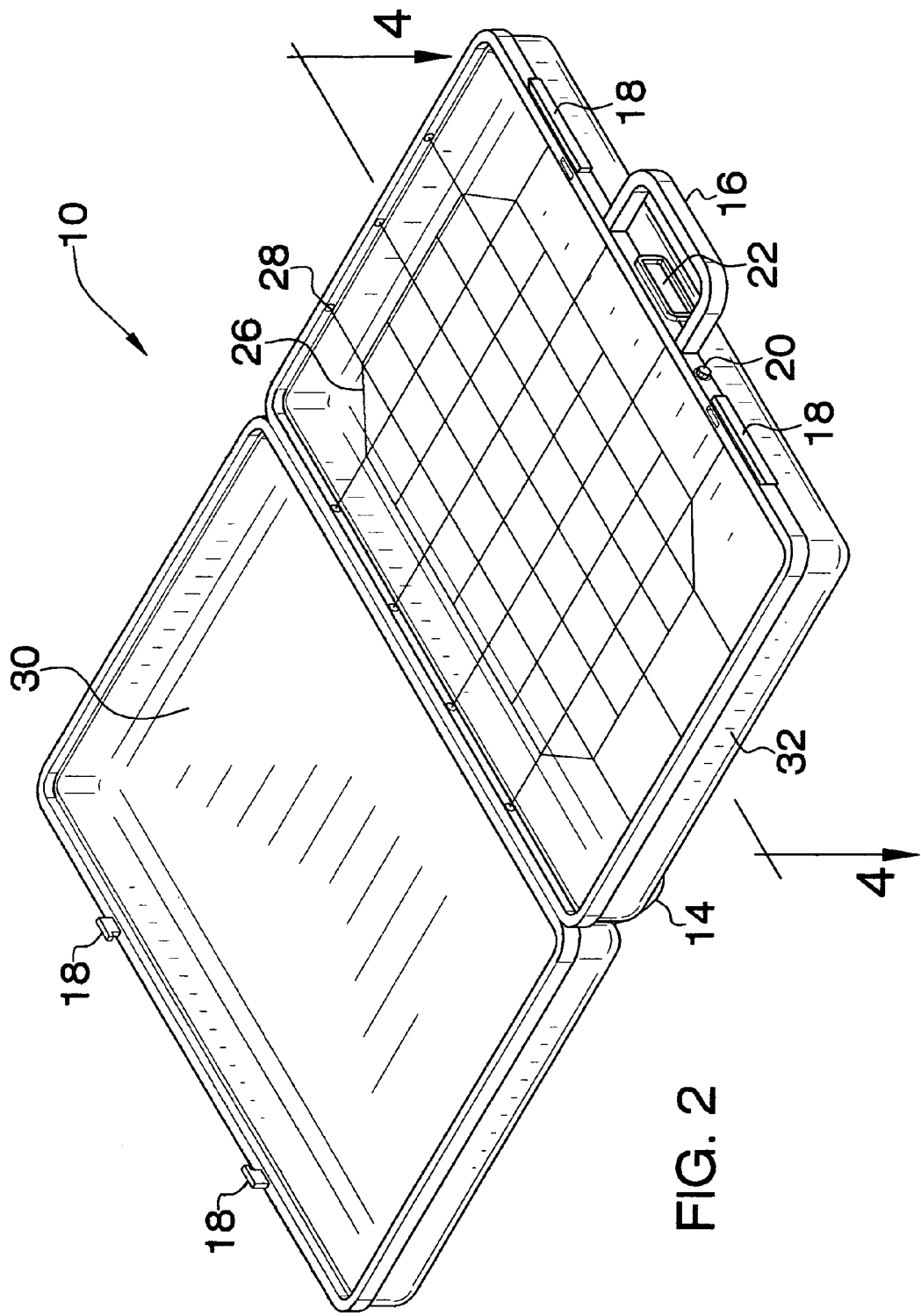
FIG. 2 is a top perspective view of the suitcase with internal load determination device of the present invention.

Moving on to FIG. 2, a new and improved suitcase with internal load determination device 10 of the present invention for determining the weight of a suitcase without requiring the user to lift the loaded suitcase is illustrated and will be described. More particularly, the suitcase with internal load determination device 10 is depicted in its open position with latches 18 unlatched. Bottom 32 has sensor grid 26 suspended within its interior. Sensor grid 26 is a net connected to sensors 28 arranged around the perimeter of the interior of bottom 32. When a load (not shown) is placed upon sensor grid 26, the force exerted by sensor grid 26 on sensors 28 determines the weight of the load, which is displayed on display 22. Display 22 can display the weight of only the load or the weight of the load plus the weight of the empty suitcase with internal load determination device 10. Handle 16 is positioned over display 22 to not only provide a user with a convenient location to grip suitcase with internal load determination device 10, but also to protect display 22 from damage caused by undesirable contact with external items. On/off switch 20 controls the flow of electricity to sensors 28 and display 22.

Figure 3:
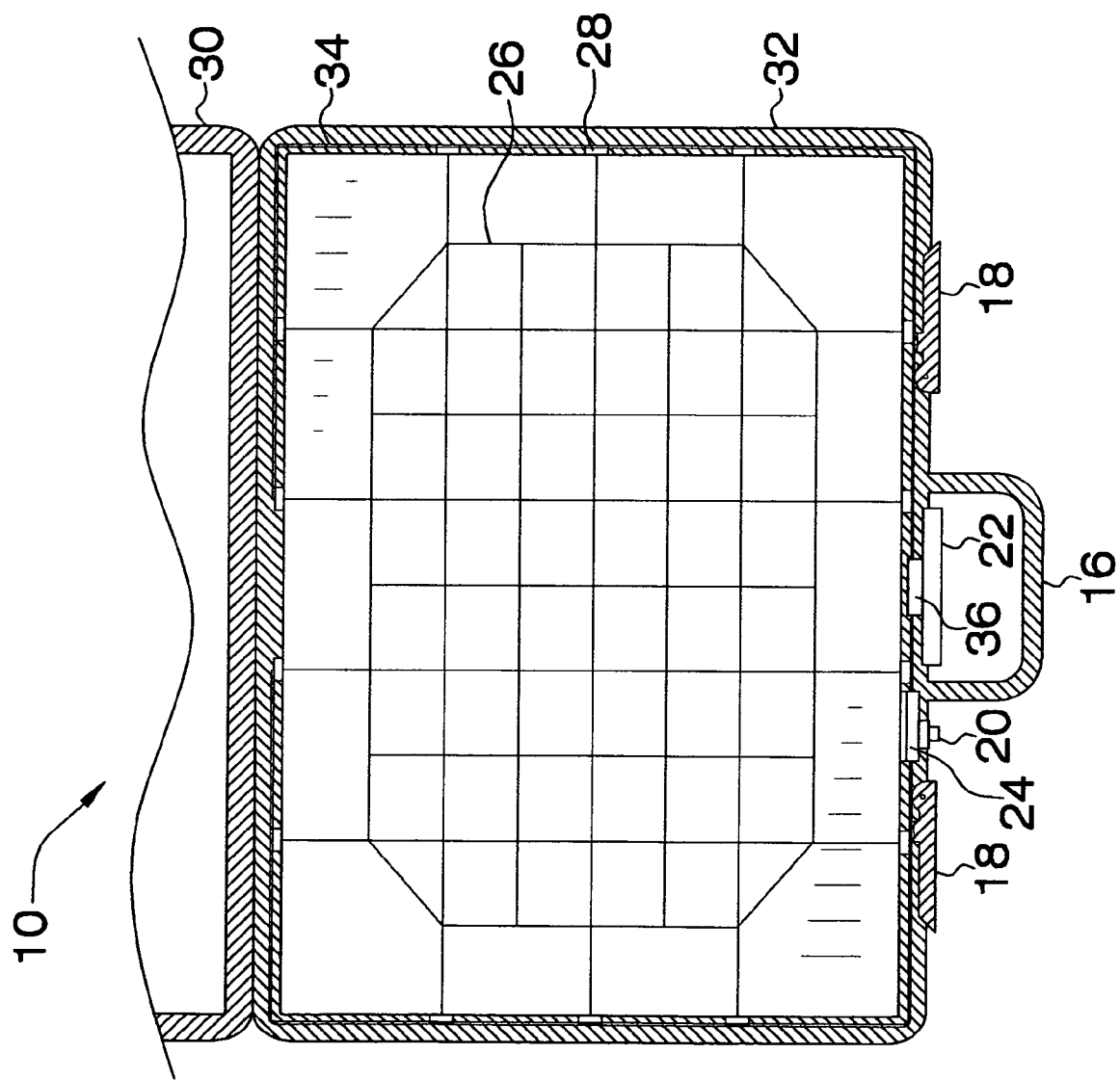
FIG. 3 is a top sectional fragmentary view of the suitcase with internal load determination device of the present invention.

Continuing with FIG. 3, a new and improved suitcase with internal load determination device 10 of the present invention for determining the weight of a suitcase without requiring the user to lift the loaded suitcase is illustrated and will be described. More particularly, the suitcase with internal load determination device 10 has a sensor grid 26 connected to an array of sensors 28 arranged around the perimeter of the interior of bottom 32. Sensors 28, CPU 36, on/off switch 20, and battery 24 are electrically connected to one another by wires 34. Display 22 is electrically connected to CPU 36. When on/off switch 20 is in its off position, the flow of electricity is cut off. When the on/off switch 20 is in its on position, electricity flows from battery 24, sensors 28 measure the force exerted on them by sensor grid 26, and sensors 28 provide this information to CPU 36. CPU 36 then calculates the weight of the load, adds the weight of the unloaded suitcase with internal load determination device 10 to the amount if the user so desires, and causes display 22 to display the gross or net amount. Top 30 is hingedly attached to bottom 32 along one side.

Figure 4:
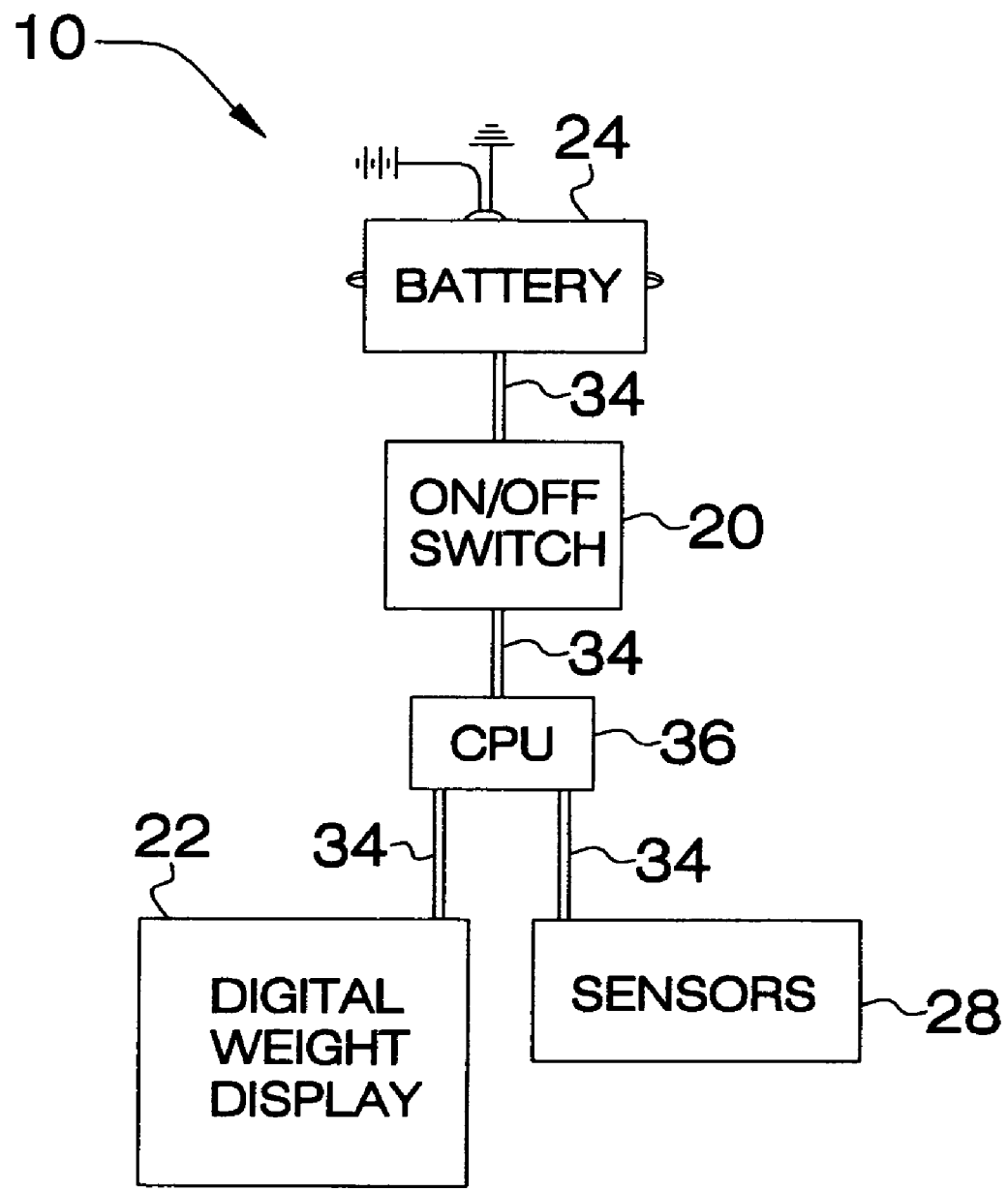
FIG. 4 is a schematic view of the suitcase with internal load determination device of the present invention.

Concluding with FIG. 4, a new and improved suitcase with internal load determination device 10 of the present invention for determining the weight of a suitcase without requiring the user to lift the loaded suitcase is illustrated and will be described. More particularly, the suitcase with internal load determination device 10 has a battery 24 controlled by on/off switch 20. Wires 34 connect battery 24 to on/off switch 20. Wires 34 also connect on/off switch to CPU 36, which is in turn connected by wires 34 to display 22 and sensors 28.

In use, it can now be understood that the user unlatches latches 18 to open suitcase with internal load determination device 10. The user places a load on sensor grid 26 in bottom 32. To measure the weight of the load, the user depresses on/off switch 20. Sensors 28 measure the force exerted upon them by the load on sensor grid 26 and report this amount to CPU 36 CPU 36 calculates the weight of the load and causes display 22 to display it. The user can depress on/off switch 20 to toggle between gross and net weights as well as to turn off sensors 28, CPU 36, and display 22. CPU 36 may also be programmed to turn off on/off switch 20 after a set period of time has passed.

While a current embodiment of the suitcase with internal load determination device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, cardboard, vinyl, leather, or fabric may be used instead of the hard plastic described. Also, the LCD display may also be any other type of electronic display. And although determining the weight of a suitcase without requiring the user to lift the loaded suitcase has been described, it should be appreciated that the suitcase with internal load determination device herein described is also suitable for a wide variety of containers. Furthermore, a wide variety of devices for determining weight may be used instead of the sensor grid, sensors, and CPU described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A suitcase with internal load determination device comprising:
   a top having opposing sides;
   a bottom having opposing sides, opposing ends, and an interior with one of said opposing sides hingedly attached to one of said opposing sides of said top;
   a CPU attached to one of said opposing sides of said bottom opposite said hingedly attached side;
   a display electrically connected to said CPU;
   a battery attached to one of said opposing sides of said bottom adjacent to said CPU;
   a plurality of sensors attached to said opposing sides and opposing ends of said bottom;
   a sensor grid suspended within said interior of said bottom and connected to said sensors; and
   a plurality of wires electrically connecting said sensors, said battery, said CPU, and said display to one another.

2. The suitcase with internal load determination device as defined in claim 1, further comprising an on/off switch electrically connected by said wires to said battery, said display, said CPU, and said sensors.

3. The suitcase with internal load determination device as defined in claim 1, further comprising a handle attached to one of said opposing sides of said bottom and extending over said display.

4. The suitcase with internal load determination device as defined in claim 1, further comprising a plurality of feet attached to said hingedly attached side of said top.

5. The suitcase with internal load determination device as defined in claim 1, further comprising a plurality of wheels attached to said hingedly attached side of said bottom.

6. The suitcase with internal load determination device as defined in claim 1, wherein said display is selected from the group comprising LCD displays, LED displays, and OLED displays.

7. The suitcase with internal load determination device as defined in claim 1, further comprising a latch releasably connecting one of said opposing sides of said top to one of said opposing sides of said bottom.

8. In combination with a suitcase, including a top having opposing sides and a bottom having opposing sides, opposing ends, and an interior, the improvement which comprises:
   a CPU attached to one of said opposing sides of said bottom opposite said hingedly attached side;
   a display electrically connected to said CPU;
   a battery attached to one of said opposing sides of said bottom adjacent to said CPU;
   a plurality of sensors attached to said opposing sides and opposing ends of said bottom;
   a sensor grid suspended within said interior of said bottom and connected to said sensors; and
   a plurality of wires electrically connecting said sensors, said battery, said CPU, and said display to one another.

9. The suitcase with internal load determination device as defined in claim 8, further comprising an on/off switch electrically connected by said wires to said battery, said display, said CPU, and said sensors.

10. The suitcase with internal load determination device as defined in claim 8, further comprising a handle attached to one of said opposing sides of said bottom and extending over said display.

11. The suitcase with internal load determination device as defined in claim 8, further comprising a plurality of feet attached to said hingedly attached side of said top.

12. The suitcase with internal load determination device as defined in claim 8, further comprising a plurality of wheels attached to said hingedly attached side of said bottom.

13. The suitcase with internal load determination device as defined in claim 8, wherein said display is selected from the group comprising LCD displays, LED displays, and OLED displays.

14. The suitcase with internal load determination device as defined in claim 8, further comprising a latch releasably connecting one of said opposing sides of said top to one of said opposing sides of said bottom.

15. A method for determining the internal load of a suitcase comprising the steps of:
   obtaining the suitcase with internal load determination device as defined in claim 2;
   opening the suitcase with internal load determination device;
   placing a load in said interior of said bottom on top of said sensor grid;
   depressing said on/off switch;
   responsive to said on/off switch being depressed, said sensors measuring force exerted on them by said load on top of said sensor grid and providing the measurements to said CPU;
   responsive to receiving said measurements from said sensors, said CPU calculating a weight of said load on top of said sensor grid and directing said display to display said weight of said load;
   viewing said weight of said load on said display;
   depressing said on/off switch;
   responsive to said on/off switch being depressed, said CPU adding an empty weight of said suitcase with internal load determination device to said weight of said load and directing said display to display a combined weight of said load and said empty weight of said suitcase with internal load determination device; and
   viewing said combined weight on said display.

\* \* \* \* \*